(12) United States Patent
Grech et al.

(10) Patent No.: US 10,654,528 B1
(45) Date of Patent: May 19, 2020

(54) PASSENGER VEHICLE AND METHOD OF MANUFACTURE

(71) Applicant: Edward P Grech, Riverside, CA (US)

(72) Inventors: Edward P. Grech, Laguna Beach, CA (US); Gregory S Beck, Valley Center, CA (US); David Reagan, Yorba Linda, CA (US)

(73) Assignee: Edward P. Grezh, Riverside, CA (US)

( * ) Notice: Subject to any disclaimer, the term of this patent is extended or adjusted under 35 U.S.C. 154(b) by 84 days.

(21) Appl. No.: 15/917,613

(22) Filed: Mar. 10, 2018

Related U.S. Application Data

(60) Provisional application No. 62/631,478, filed on Feb. 15, 2018.

(51) Int. Cl.
*B62D 31/02* (2006.01)
*B62D 47/02* (2006.01)
(Continued)

(52) U.S. Cl.
CPC ............. *B62D 31/02* (2013.01); *B60R 5/00* (2013.01); *B62D 25/20* (2013.01); *B62D 47/02* (2013.01); *B62D 65/02* (2013.01)

(58) Field of Classification Search
CPC ...... B62D 31/02; B62D 47/02; B62D 31/025; B62D 25/06; B62D 31/04; B62D 29/043;
(Continued)

(56) References Cited

U.S. PATENT DOCUMENTS

D237,699 S    11/1975   Brennan et al.
D314,733 S    2/1991   Richter, Jr. et al.
(Continued)

OTHER PUBLICATIONS

U.S. Appl. No. 29/480,926, filed Apr. 24, 2015, Grech office action.
(Continued)

*Primary Examiner* — D Glenn Dayoan
*Assistant Examiner* — Sunsurraye Westbrook
(74) *Attorney, Agent, or Firm* — John J. Connors; Connors & Assoc. pc

(57) ABSTRACT

A passenger vehicle has a framework reconstructed from a vehicle chassis that is original manufacturing equipment. The vehicle includes an internal support structure comprising a central support section between a forward support section and a rearward support section. The central support section is closer to ground that the forward and rearward support sections. A front wheel assembly near the front of the vehicle extends across and is supported by the forward support section, and a rear wheel assembly near the rear of the vehicle extends across and is supported by the rearward support section. A passenger compartment framework is elevated above the central support structure, and a baggage compartment framework is beneath the passenger compartment framework. The baggage compartment framework includes a baggage opening in each opposed side of the vehicle, thereby providing access to an unobstructed storage zone that enables baggage to be placed in the storage zone from one side of the vehicle through one baggage opening and removed from the storage zone from the other side of the vehicle through the other baggage opening.

6 Claims, 17 Drawing Sheets

(51) Int. Cl.
*B62D 65/02* (2006.01)
*B60R 5/00* (2006.01)
*B62D 25/20* (2006.01)

(58) Field of Classification Search
CPC ............... B62D 27/026; B62D 33/044; B60R 16/0207; B60R 21/12; B60R 9/02; B60R 16/04; B60R 19/38; B60R 19/48; B60R 21/026; B60R 21/13
USPC ........ 296/178, 210, 191, 29, 205, 24.4, 201, 296/25, 202; 105/397, 15, 18, 1.1, 20, 105/396, 443, 461; 280/6.152, 488, 781, 280/834, 749, 796
See application file for complete search history.

(56) References Cited

U.S. PATENT DOCUMENTS

| | | | |
|---|---|---|---|
| D376,772 S | 12/1996 | Martin | |
| D384,914 S | 10/1997 | Bingaman | |
| D391,524 S | 3/1998 | Anderson et al. | |
| D409,951 S | 5/1999 | Grech | |
| D411,141 S | 6/1999 | Gerisch et al. | |
| 5,934,738 A | 8/1999 | Welles | |
| D436,894 S | 1/2001 | Barraclough et al. | |
| D466,442 S | 12/2002 | Cornell et al. | |
| D531,546 S | 11/2006 | Fillion et al. | |
| D656,866 S | 4/2012 | Wise | |
| D708,557 S | 7/2014 | Grech | |
| D711,786 S | 8/2014 | Brzustowicz et al. | |
| 8,910,992 B2 | 12/2014 | Grech | |
| D727,811 S | 4/2015 | Grech | |
| 2003/0209922 A1* | 11/2003 | Emmons | B60G 7/02 296/203.01 |
| 2005/0269834 A1* | 12/2005 | Toth | B62D 31/02 296/178 |
| 2007/0102958 A1* | 5/2007 | Fillion | B62D 33/044 296/178 |
| 2008/0116714 A1* | 5/2008 | Timmermans | B62D 25/06 296/178 |

OTHER PUBLICATIONS

U.S. Appl. No. 29/480,926, filed Oct. 8, 2015, Grech office action.
U.S. Appl. No. 29/480,931, filed Apr. 24, 2015, Grech office action.
U.S. Appl. No. 29/480,931, filed Jan. 22, 2016, Grech office action.
U.S. Appl. No. 29/480,931, filed Jul. 28, 2016, Grech office action.
U.S. Appl. No. 29/480,934, filed Dec. 8, 2014, Grech office action.
U.S. Appl. No. 29/480,934, filed Apr. 24, 2015, Grech office action.
U.S. Appl. No. 29/480,934, filed Jan. 22, 2016, Grech office action.
U.S. Appl. No. 29/480,934, filed Jul. 29, 2016, Grech office action.
Letter of Dec. 2, 2015, Ameritrans Bus and ABC Bus, citing patents and non-patent literature, U-Tube video, websites, etc., also being disclosed separately on this form.
Exhibt A Jan. 28, 2013 YouTube video, Exhibit B Concorde II by Glaval Bus Brochure.
Exhibt C Ameritrans Bus Close Ups.
http://denver.craigslist.org/ctd/527084242484.html 2008 Ford F650 Glaval Midsize Tour Bus.
http://www.bestbussales.com/inventory/vehicles.php 2009 Glaval Concorde II.
http://donbrownbus.com/inventory/196512 2012 Newport Coachworks Luxury Shuttle Bus.
http://www.turtletop.com/.
www.federalcoachbus.com.
www.freightlinertrucks.com.
Krystal F650 Bus Brochure Krystalbus.net.
U.S. Appl. No. 14/568,055, filed Oct. 22, 2015, Office action.
U.S. Appl. No. 14/568,055, filed Aug. 4, 2016, Office action.
U.S. Appl. No. 14/568,055, Feb. 21, 2017, Office action.

* cited by examiner

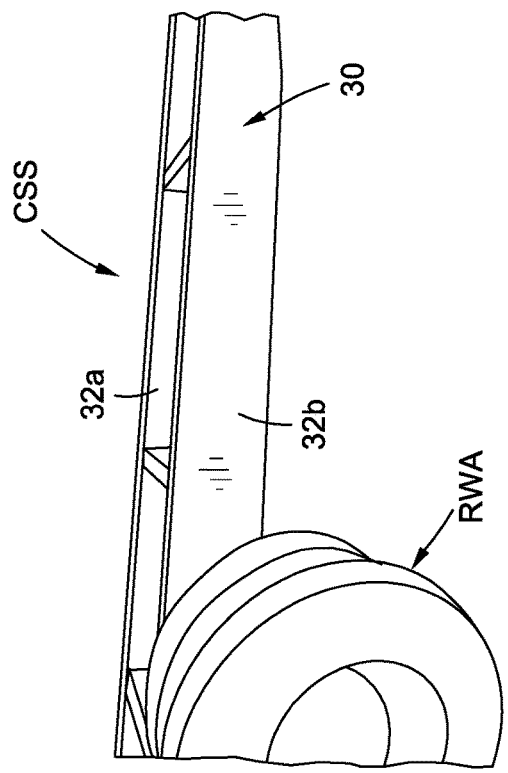
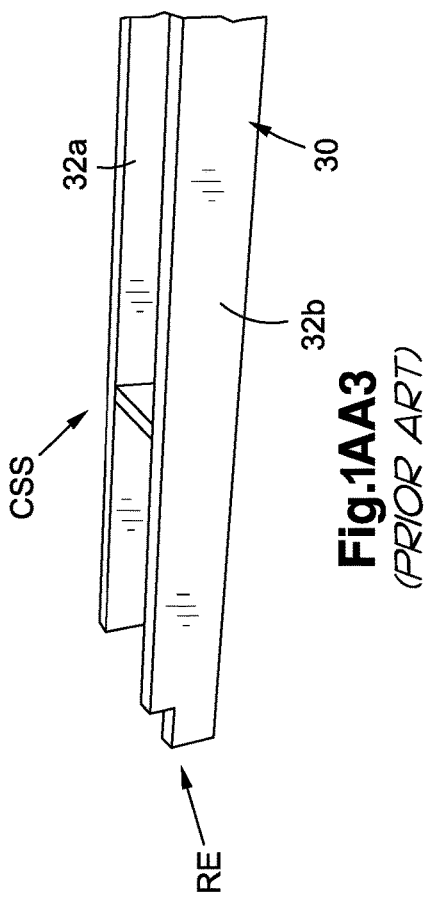
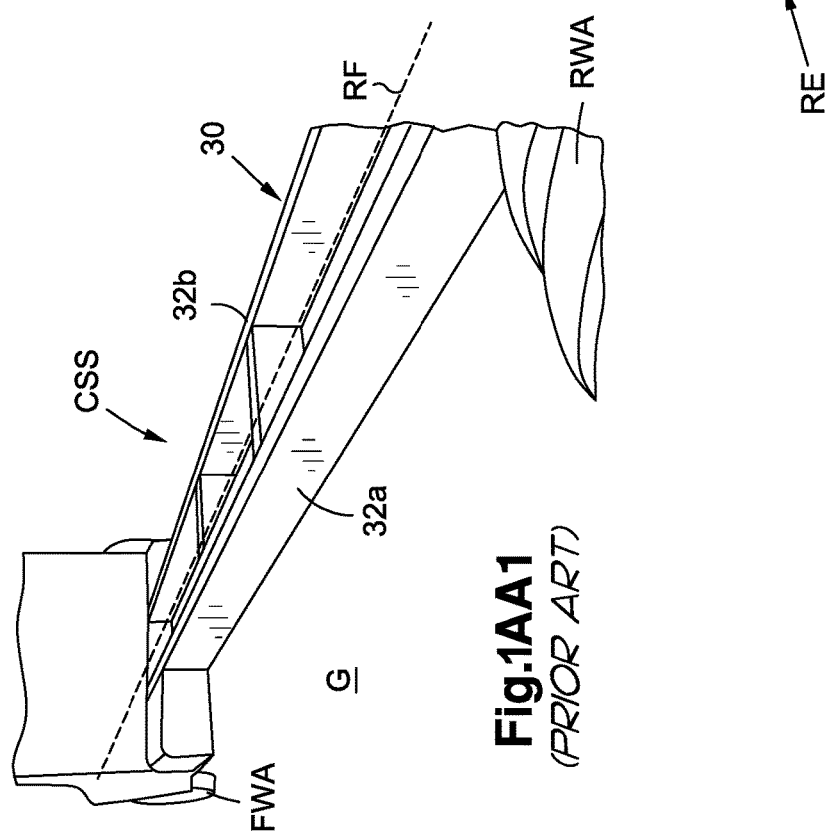
Fig.1AA2 (PRIOR ART)
Fig.1AA3 (PRIOR ART)
Fig.1AA1 (PRIOR ART)

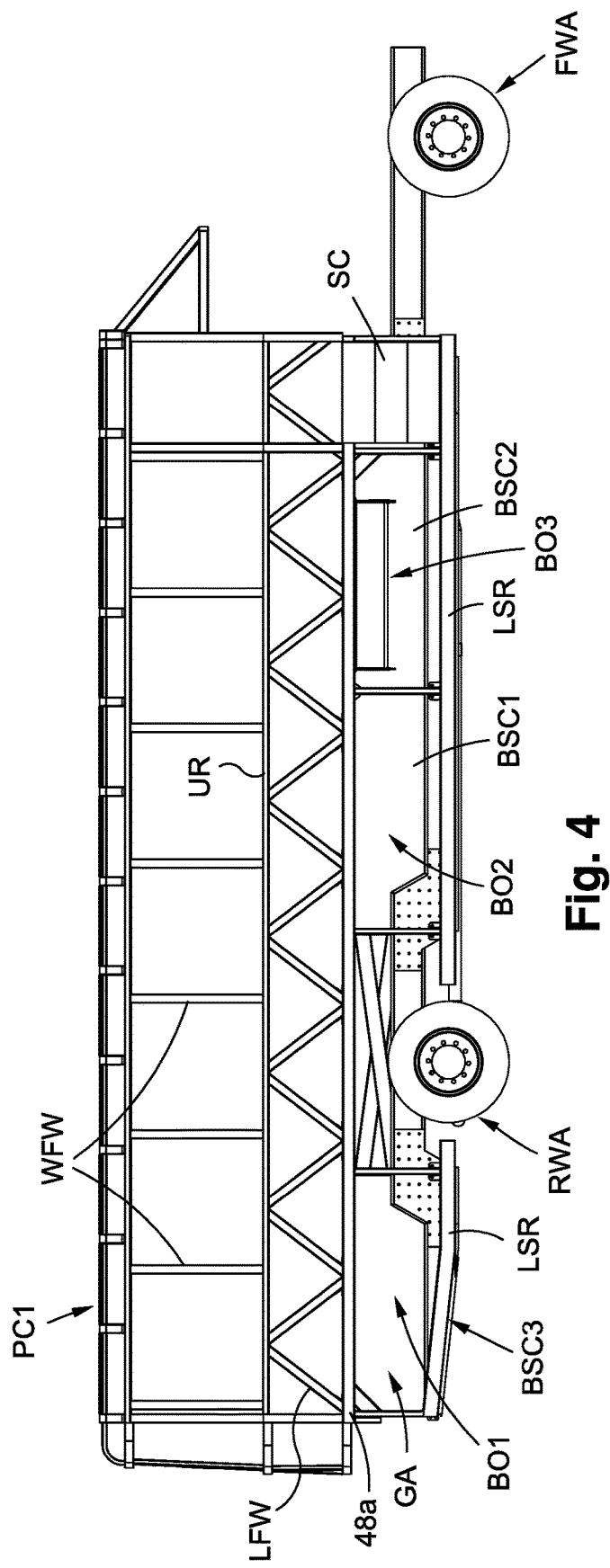
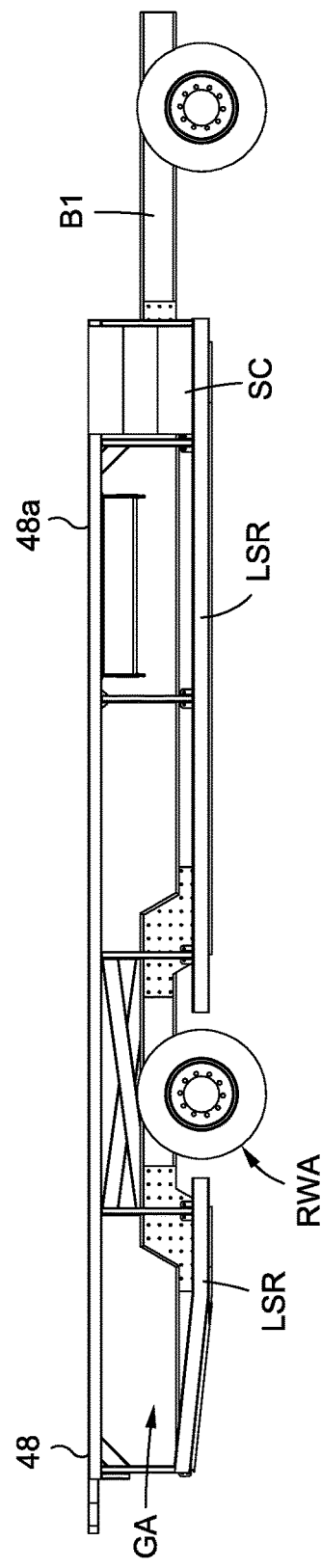
Fig. 4
Fig. 4A

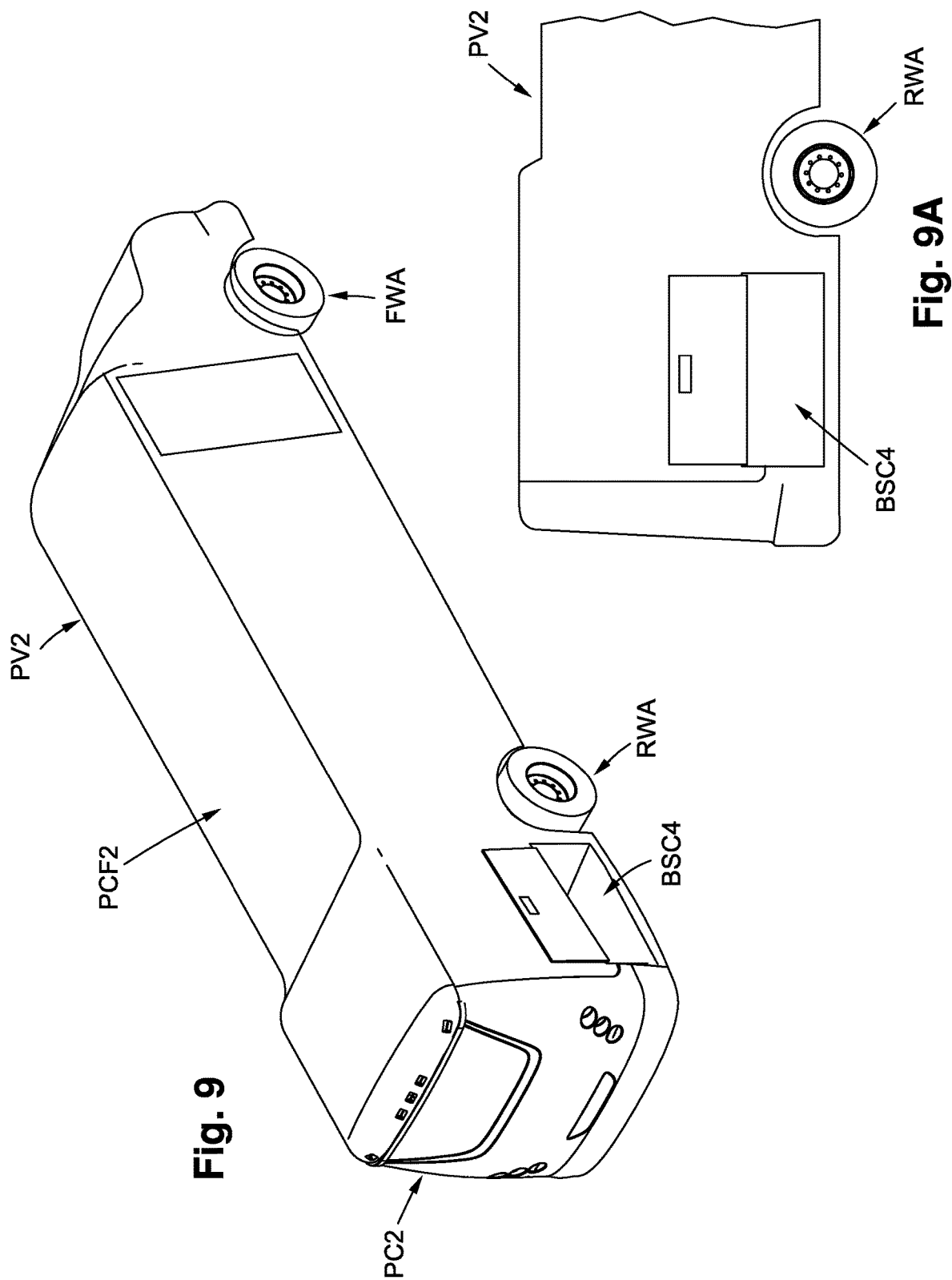

PASSENGER VEHICLE AND METHOD OF MANUFACTURE

RELATED PATENT APPLICATIONS & INCORPORATION BY REFERENCE

This non-provisional utility patent application claims the benefit under 35 USC 119(e) of U.S. Provisional Patent Application No. 62/631,478, entitled "Passenger Vehicle" filed Feb. 15, 2018. This related application is incorporated herein by reference and made a part of this application. If any conflict arises between the disclosure of the invention in this non-provisional application and that in the related provisional application, the disclosure in this non-provisional application shall govern. Moreover, any and all U. S. patents, U. S. patent applications, and other documents, hard copy or electronic, cited or referred to in this application are incorporated herein by reference and made a part of this application.

DEFINITIONS

The words "comprising," "having," "containing," "holding," and "including," and other grammatical forms thereof, are intended to be equivalent in meaning and be open ended in that an item or items following any one of these words is not meant to be an exhaustive listing of such item or items, nor meant to be limited to only the listed item or items.

The word "rectangular" includes square.

BACKGROUND

Passenger vehicles such as buses often have baggage storage compartments that may be accessed from ether side of the vehicle through baggage openings in each side of the vehicle. The baggage storage compartment is unobstructed, enabling baggage to be placed in the compartment's interior storage zone by accessing this storage zone from one side of the vehicle through one baggage opening and removed from the storage zone from the other side of the vehicle through the other baggage opening. In other words, there isn't any structure in the baggage storage compartment preventing a porter from sliding a bag into the compartment though an opening in one side of the vehicle and then out an opposed opening in the other side of the vehicle.

Some passenger vehicles are constructed starting with a conventional chassis purchased from a major automobile manufacturer. The conventional chassis includes a motor attached to a pair of linear, horizontally oriented, parallel beams extending from a front end to a rear end of the chassis. A passenger compartment is mounted on top of and supported by the linear parallel beams. Consequently, there is only a very limited amount of passenger baggage storage space available in the rear of our passenger vehicle. It would be desirable to construct a baggage compartment underneath the passenger compartment. This is difficult, however, because the linear parallel beams of the conventional chassis present an obstruction preventing the sliding of baggage between a pair of aligned opposed baggage openings in an under-beam baggage compartment. Typically, there isn't a rear window, because the rear of the vehicle is used to store passenger baggage. Storing baggage usually means lifting the baggage sometimes overhead to pile it up one bag upon another in a rear storage area.

SUMMARY

In brief, our passenger vehicle includes a front, a rear, opposed sides, a passenger compartment including a floor to which seats are attached, and a baggage compartment beneath the passenger compartment. At the least, the vehicle's front and rear wheel assemblies are components of a vehicle chassis including a pair of linear, central, parallel beams supporting the assemblies at a predetermined height above ground. At least one section of the beams is displaced with respect to one or more other sections of the beams, reconfiguring the displaced section to be closer to ground than the predetermined height of the beams of the original manufacturing equipment, namely, the vehicle chassis.

A support structure elevates the floor of the passenger compartment with respect to the displaced, lowered section, separating the passenger compartment floor and the displaced, lowered section of the beams. The distance between the floor of the passenger compartment and the displaced, lowered section is at least 9 inches. The space between the floor of the passenger compartment and the displaced, lowered section define or establishes a storage zone beneath the passenger compartment. The baggage compartment includes a floor that is supported at least in part by the lowered section of the beams.

The support structure connects to the passenger compartment and the baggage compartment, elevates the floor above the beams, and frames opposed openings in the sides of the vehicle that are aligned to enable baggage to be placed in the storage zone from one side of the vehicle through one baggage opening and removed from the storage zone from the other side of the vehicle through the other baggage opening.

Passenger Vehicle

The novel and non-obvious passenger vehicle disclosed herein has one or more of the features depicted in the embodiments discussed under the heading entitled "DETAILED DESCRIPTION OF SOME ILLUSTRATIVE EMBODIMENTS." These features are not listed in any rank order nor is this list intended to be exhaustive. The claims that follow define the novel and non-obvious passenger vehicle and method of manufacturing such vehicle, distinguishing them from the prior art; however, without limiting the scope of thereof as expressed by these claims, in general terms, some, but not necessarily all, of their features are:

One, our passenger vehicle has an internal, central support structure, front and rear wheel assemblies, and a motor that are all components of a vehicle chassis that is original manufacturing equipment. FIGS. 1AA1-1AA3 depict a typical vehicle chassis 30 that is original manufacturing equipment. It includes a central support structure CSS usually comprising a pair of linear, central, parallel beams 32a and 32b that support a front wheel assembly FWA and a rear wheel assembly RWA, and a motor M (FIG. 1) mounted to a front of the vehicle chassis 30 and operably connected to the rear wheel assembly by a conventional drive system (not shown).

Two, in constructing our passenger vehicle, each support beam of the pair beams of the original vehicle chassis 30 is severed. In one embodiment, these beams are severed or cut into at least three sections. In another embodiment, these beams only need to be severed or cut in one place. The cut sections are reconnected to lower one section with respect to another section.

In the one embodiment, the three sections are connected together to reconfigure the support beams of the original manufacturing equipment into: (i) a pair of opposed, linear parallel, forward beam sections, (ii) a pair of opposed, linear, parallel, rearward beam sections, and (iii) a pair of opposed, linear, parallel, central beam sections. The pair of central beam sections is closer to the ground than the forward and rearward sections, and typically the forward and rearward central beam sections are from 10 to 18 inches above ground.

In the other embodiment illustrated, only rear end portions of the rearward beam sections are severed to provide (iv) a pair of opposed, linear, parallel, terminal beam sections that generally are the same distance above ground as the central beam sections. As discussed subsequently in greater detail, this enables construction of baggage compartments on both sides of the rear wheel assembly RWA. The terminal beam sections have inner ends connected to raised portions of the rearward beam sections and outer ends that terminate adjacent a rear end of the vehicle. The length of the forward beam sections range from 90 to 30 inches, length of the central beam sections range from 120 to 170 inches, and the length of the rearward beam sections range from 90-110 to 172 inches, 172 to back end and the length of the terminal beam sections range from 60 to 90 inches.

Four, the front wheel assembly FWA is near the front of the vehicle and extends across and is supported by a pair of opposed forward sections of the parallel beams that is at a predetermined height above ground of at least 20 inches, and the rear wheel assembly RWA is near the rear of the vehicle and extends across and is supported by a pair of opposed rearward sections of the parallel beams that are also at said predetermined height above ground of at least 20 inches. The pair of opposed central sections of the parallel beams is at a predetermined height above ground of no more than 18 inches so that the central section is closer to ground than the forward and rearward sections.

Five, the vehicle has an elevated passenger compartment framework including a floor above the central support structure, and a baggage compartment framework beneath the floor of the passenger compartment framework. A floor of the baggage compartment framework is supported by the pair of central beam sections. The baggage compartment framework includes a baggage opening in each opposed side of the vehicle providing access to an unobstructed storage zone enclosed by the baggage compartment framework. The reconfiguration of the linear beams of the original vehicle chassis 30 removes any obstruction that the linear or linear beams of the original vehicle chassis 30 presented. Consequently, baggage can to be placed in the storage zone from one side of the vehicle through one baggage opening and removed from the storage zone from the other side of the vehicle through the other baggage opening.

Six, the baggage compartment framework includes a pair of upper side rails and pair of lower side rails. The lower side rails are at or near the level of the central sections of the beams and the upper side rails are above the central beam sections. The distance between the pair of upper side rails and pair of lower side rails may be from 9 to 14 inches, and the storage zone has a volume from 300 to 500 cubic feet. The baggage openings may be aligned and in registration.

Seven, a staircase in a side of the vehicle near the forward beam sections and in advance of the baggage compartment framework between the front wheel assembly and the baggage compartment framework, said staircase having an entrance at a height above ground at or near the height above ground as the central beam sections and an exit positioned so a passenger ascends the staircase and steps onto the floor of the passenger compartment framework.

Method of Manufacturing Our Passenger Vehicle

In our method of manufacturing our passenger vehicle, a vehicle chassis that is original manufacturing equipment is employed. This provides costs reduction, because the motor, front and rear wheel assemblies, drive train, braking, and steering systems, etc. are already present and connected. Our method simply calls for severing the support beams into at least three beam sections and connecting these three sections together to reconfigure the support beams of the original manufacturing equipment into the pair of opposed, parallel, forward sections, the pair of opposed, parallel, rearward sections, and the pair of opposed, parallel, central sections. Upon reconnecting the severed beam sections, the pair of central sections are closer to the ground that the forward and rearward sections. An elevated passenger compartment framework is attached to the reconfigured support beams and a baggage compartment framework is positioned beneath the passenger compartment framework. The baggage compartment framework is constructed to provide a baggage opening in each opposed side of the vehicle. The reconfiguration of the central support structure of the original vehicle chassis provides a storage zone devoid of any central beam structure that obstructs placement of baggage in the storage zone from an opening in either side of the vehicle. Thus, baggage may be placed in the storage zone from one side of the vehicle through one baggage opening and removed from the storage zone from the other side of the vehicle through the other baggage opening.

DESCRIPTION OF THE DRAWING

One embodiment of our passenger vehicle is discussed in detail in connection with the accompanying drawing, which is for illustrative purposes only. This drawing includes the following figures (FIGS.), with like numerals and letters indicating like parts:

FIG. 1AA1 is a perspective rear view of a conventional vehicle chassis that is original manufacturing equipment.

FIG. 1AA2 is a side view of a rear wheel assembly of the conventional vehicle chassis shown in FIG. 1AA1.

FIG. 1AA3 is a perspective view from a side of the rear end of the conventional vehicle chassis shown in FIG. 1AA1.

FIG. 4 is a side view of the framework for the embodiment of our passenger vehicle shown in FIG. 8.

FIG. 4A is a side view similar to that of FIG. 4 with its passenger compartment framework removed.

FIG. 9 is a fragmentary perspective view of an alternate embodiment of our passenger vehicle shown in FIG. 9A.

FIG. 9A is a side view of the alternate embodiment of our passenger vehicle.

DETAILED DESCRIPTION OF SOME ILLUSTRATIVE EMBODIMENTS

Prior Art

Figure 1A:
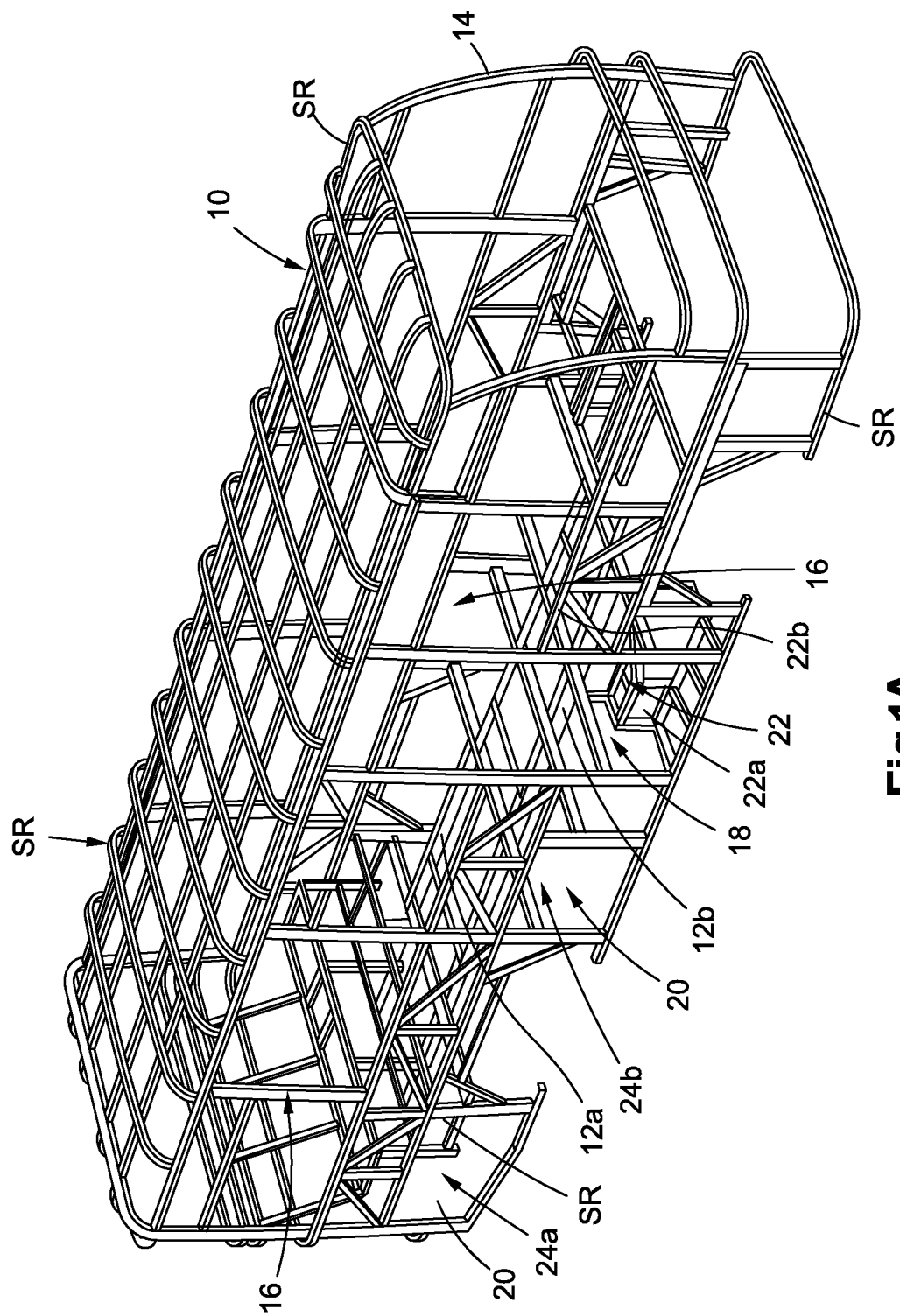
FIG. 1A is a perspective view of a passenger compartment framework of a typical passenger vehicle such as, for example, a bus.

As illustrated in FIG. A, a framework 10 of a typical passenger vehicle such as, for example, a bus, comprises a plurality of rigid support rails SR, for example, steel member tubes such as, C-shaped, J-shaped, or I-shaped members welded or otherwise connected together to enclose a pair of central, linear parallel beams 12a and 12b that support a floor (not shown) to which seats (not shown) for passengers are attached. This framework 10 is built from the ground up, and also encloses a motor, front and rear wheel assemblies and suspension systems therefor, a motor, a drive train, drive, steering, and braking systems, etc. (all not shown). The framework 10 below the floor and rearward of a stairway entrance 18 defines a baggage compartment framework 20. The stairway entrance 18 is on a right side of our passenger vehicle as viewed in FIG. A, and such entrance 18 has a staircase framework 22 having an entry end 22a terminating at the stairway entrance and an exit end 22b at the floor of the passenger compartment framework 16 and rearward of the driver's compartment framework 14. The baggage storage compartment framework 20 defines two storage zones, each of which has a pair of opposed, aligned, enlarged, openings 24a and 24b in registration, one opening on each side of our passenger vehicle. The beams 12a and 12b are elevated above the vehicle's front and rear wheel assemblies so the storage zones are unobstructed, allowing, for example, baggage to be placed in one aligned opening of the opening pair 24a and be removed from its storage zone from the other side of the vehicle through the other aligned opening of the opening pair 24a.

The vehicle chassis 30 illustrated in FIGS. 1AA1 through 1AA3 is original manufacturing equipment such as, for example, a truck chassis manufactured by Daimler Trucks North America. Such original manufacturing equipment includes a motor M (FIG. 1) at a front of the chassis and a pair of parallel, rigid, linear support beams 32a and 32b straddling a central longitudinal reference line RF of the chassis 30 and extending above ground G from the front to a rear of the chassis by approximately 26 inches depending on the manufacturer. Additionally, this conventional chassis 30 also includes a front wheel assembly FWA, a rear wheel assembly RWA, a motor M, and not shown suspensions systems for the front and rear wheel assemblies, a drive train, and drive, steering, and braking systems, etc.

General

A major advantage of our passenger vehicle is that it is constructed from the vehicle chassis 30 illustrated in FIGS. 1AA1 through 1AA3. Our method of manufacturing our passenger vehicle requires severing the pair of linear parallel beams 32a and 32b and reconfiguring and lowering a severed section thereof with respect to remaining elevated sections of the beams.

In the embodiment depicted in FIGS. 1 through 8C and generally designated by the alpha-numeral PV1, the parallel beams 32a and 32b are cut into a plurality of sections to construct beneath the passenger compartment PC1 (FIG. 8) more than one baggage storage compartments, namely, compartments BSC1 through BSC3. Each of the beams 32a and 32b of the conventional chassis is cut in at least two places, one place rearward of the front wheel assembly FWA of the conventional chassis and the other place near and forward of the rear wheel assembly RWA of the conventional chassis.

In the embodiment depicted in FIGS. 9 and 9A and generally designated by the alpha-numeral PV2, only a single baggage storage compartment BSC4 is constructed at the rear of the vehicle beneath a passenger compartment PC2, with only a rear portion thereof having an elevated passenger floor. In this case, the beams 32a and 32b of the conventional chassis 30 are severed only rearward of the rear wheel assembly RWA of the conventional chassis to construct a rear storage compartment BSC4 beneath the passenger compartment PC2.

In our passenger vehicle PV1, the entire passenger compartment PC1 is elevated with respected to the reconfigured beams B1 and B2. In our passenger vehicle PV2, only a rear portion of the passenger compartment PC2 is elevated with respected to the reconfigured beams B4 and B5 (not shown). In vehicles PV1 and PV2, passenger compartment frameworks PCF1 and PCF2, respectively, are attached to the reconfigured beams of the vehicle chassis 30 and baggage compartment frameworks are positioned beneath a floor framework FF. The baggage compartment frameworks are constructed to provide a baggage opening in each opposed side of the vehicle. With doors D raised uncovering the openings and providing access to the inside of the baggage compartments, the baggage is placed inside these compartments from either side of the vehicle. The reconfiguration of the beam structure of the original vehicle chassis 30 provides storage zones devoid of structure which would prevent accessing the storage zone from an opening in either side of the vehicle or prevent passing baggage through the baggage compartment into an opening on one side of the vehicle, through the storage zone, and out an opening on the other side of the vehicle. Thus, baggage may be placed in the storage zone from one side of the vehicle through one baggage opening and removed from the storage zone from the other side of the vehicle through the other baggage opening. The passenger compartment and baggage compartment frameworks of both vehicles, PV1 and PV2 are covered by a skin S (FIG. 8) that encloses the passengers in the vehicles.

FIGS. 1-8C

Figure 1:
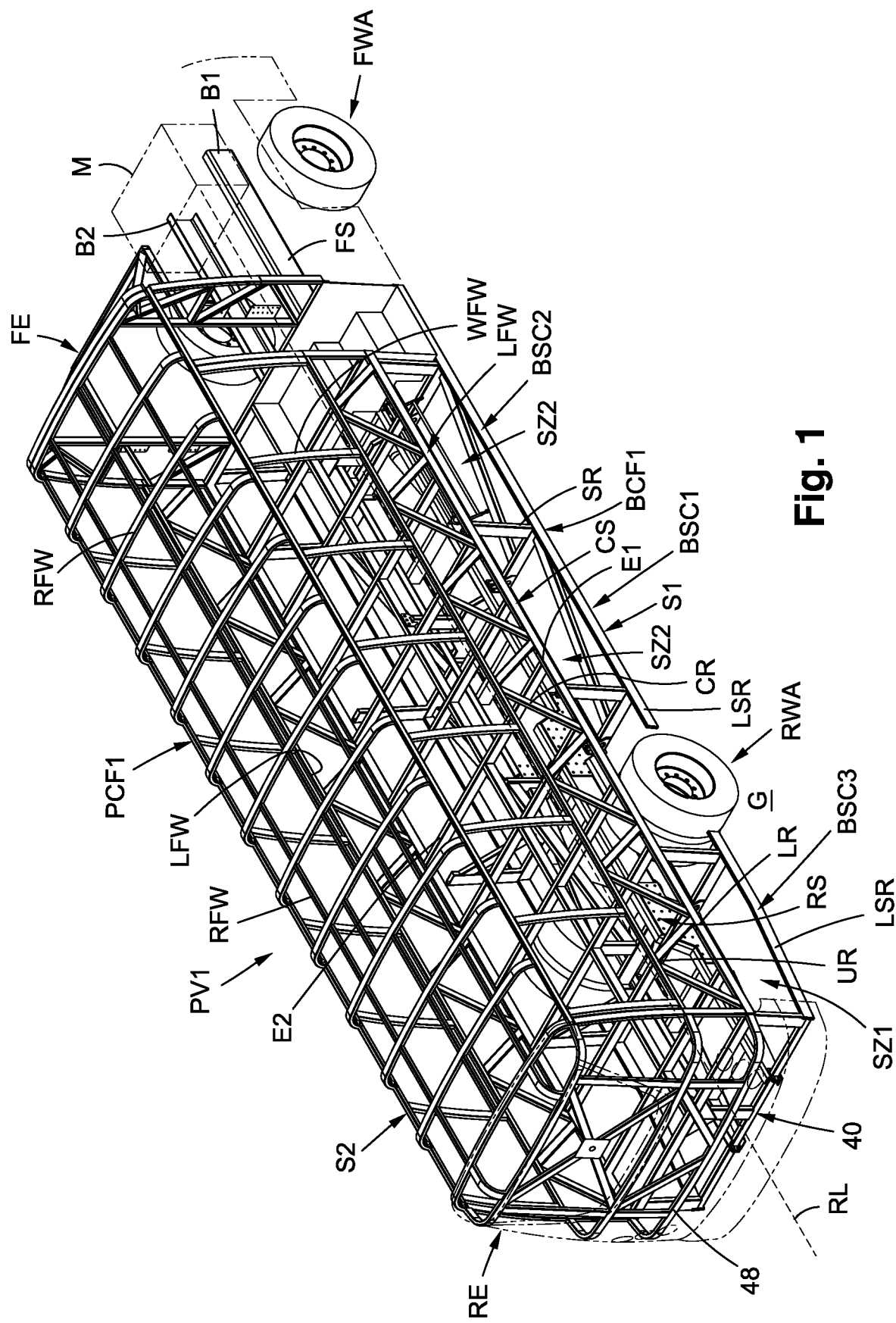
FIG. 1 is a perspective view of the framework for one embodiment of our passenger vehicle shown in FIG. 8.
Figure 2A:
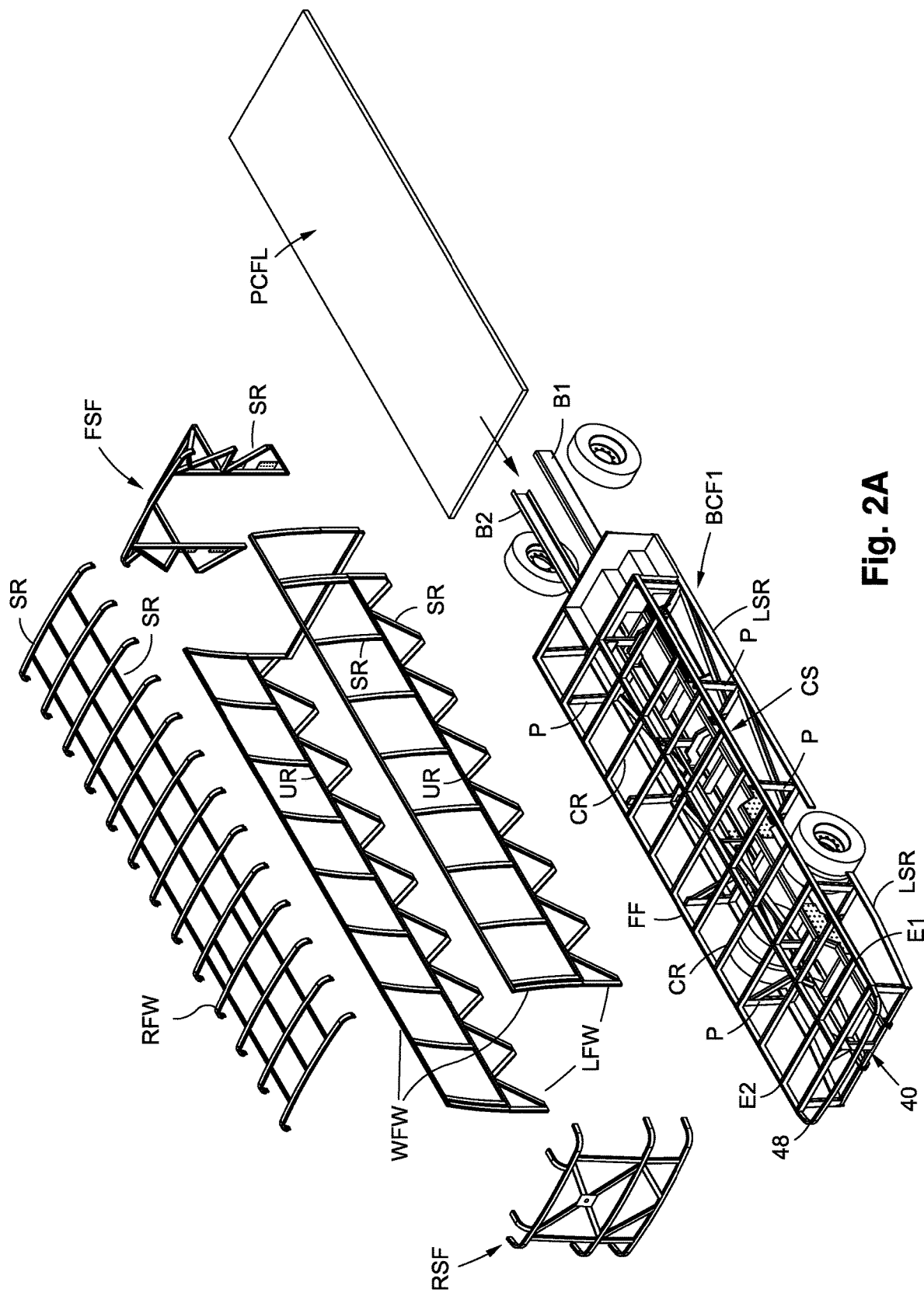
FIG. 2A is an exploded perspective view of the framework for the embodiment of our passenger vehicle shown in FIG. 8.
Figure 2B:
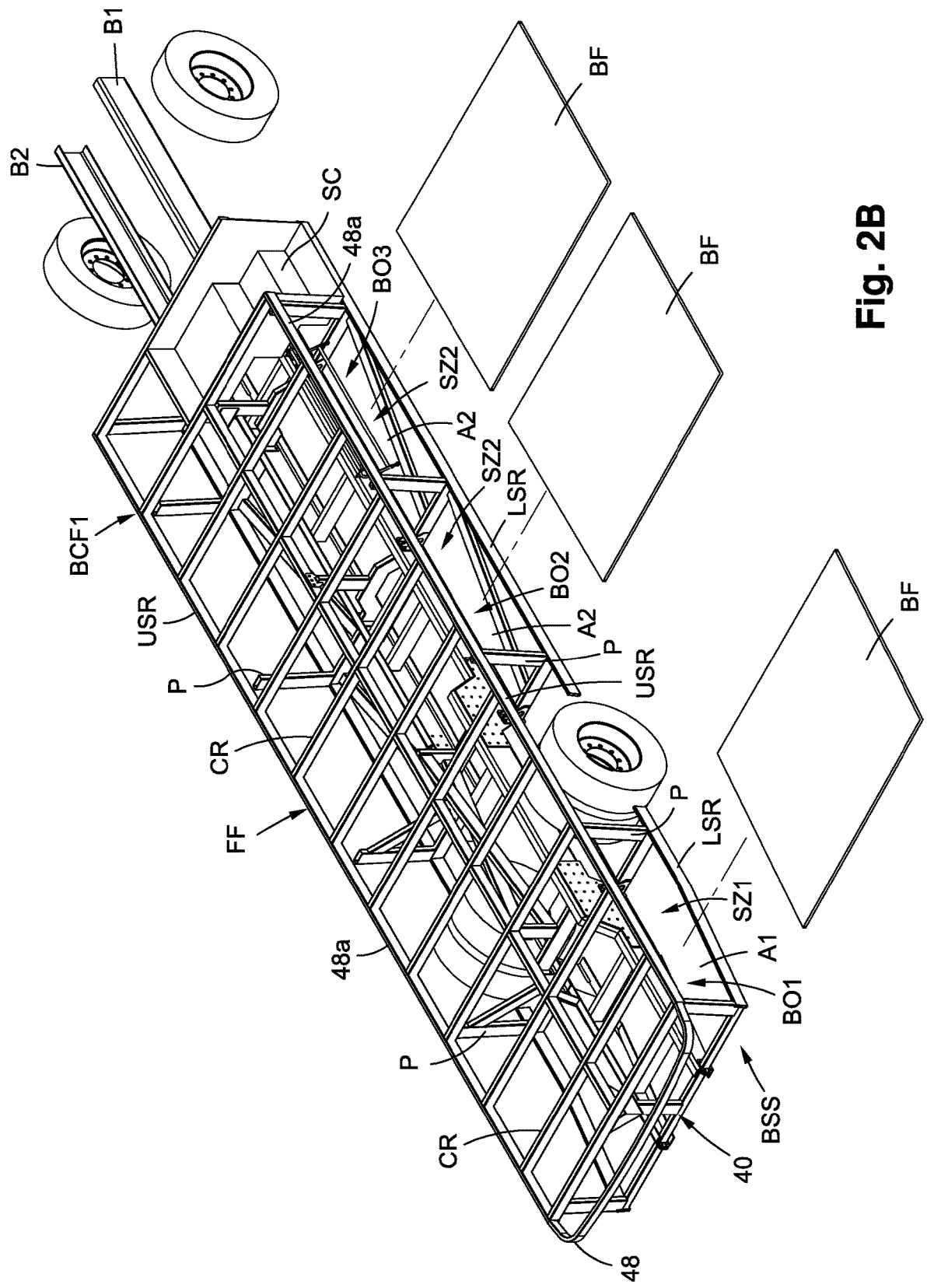
FIG. 2B is an exploded perspective view of the sunken baggage compartment framework of the embodiment of our passenger vehicle shown in FIG. 8.
Figure 2C:
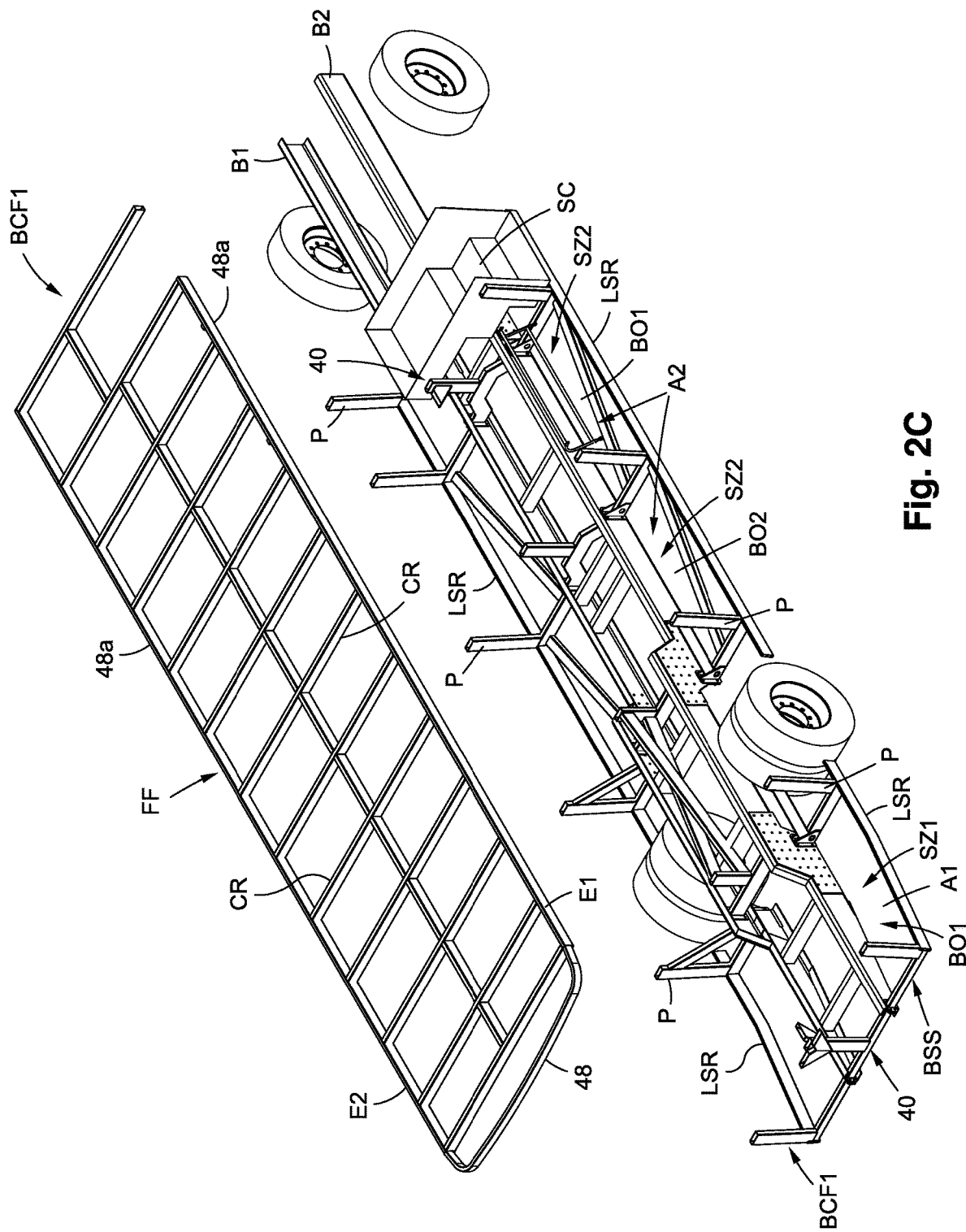
FIG. 2C is a perspective view of the sunken baggage compartment framework similar to that of FIG. 2B with its floor support structure exploded.
Figure 2D:
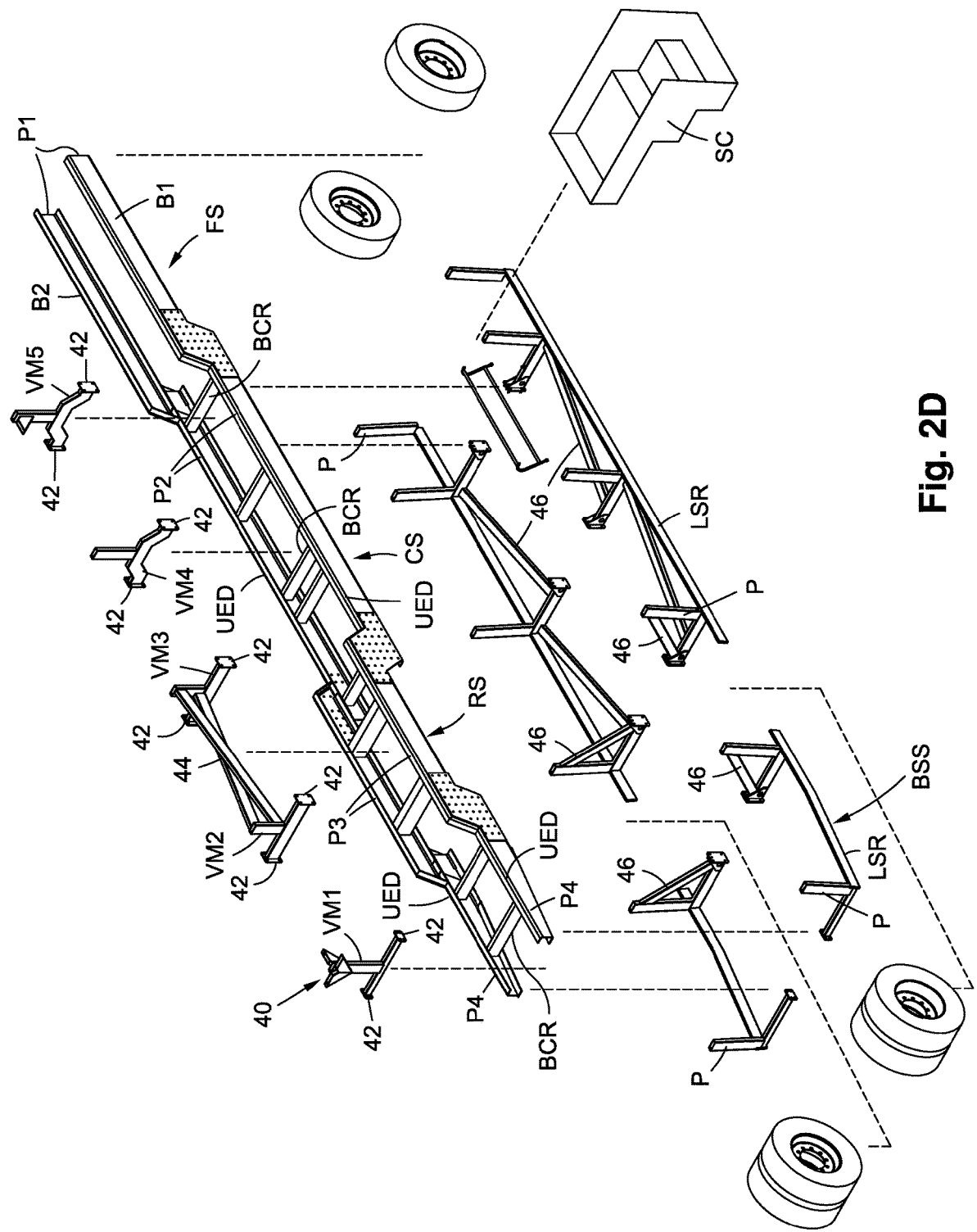
FIG. 2D is an exploded perspective view of the reconfigured beams of the embodiment of our passenger vehicle shown in FIG. 8.
Figure 2E:
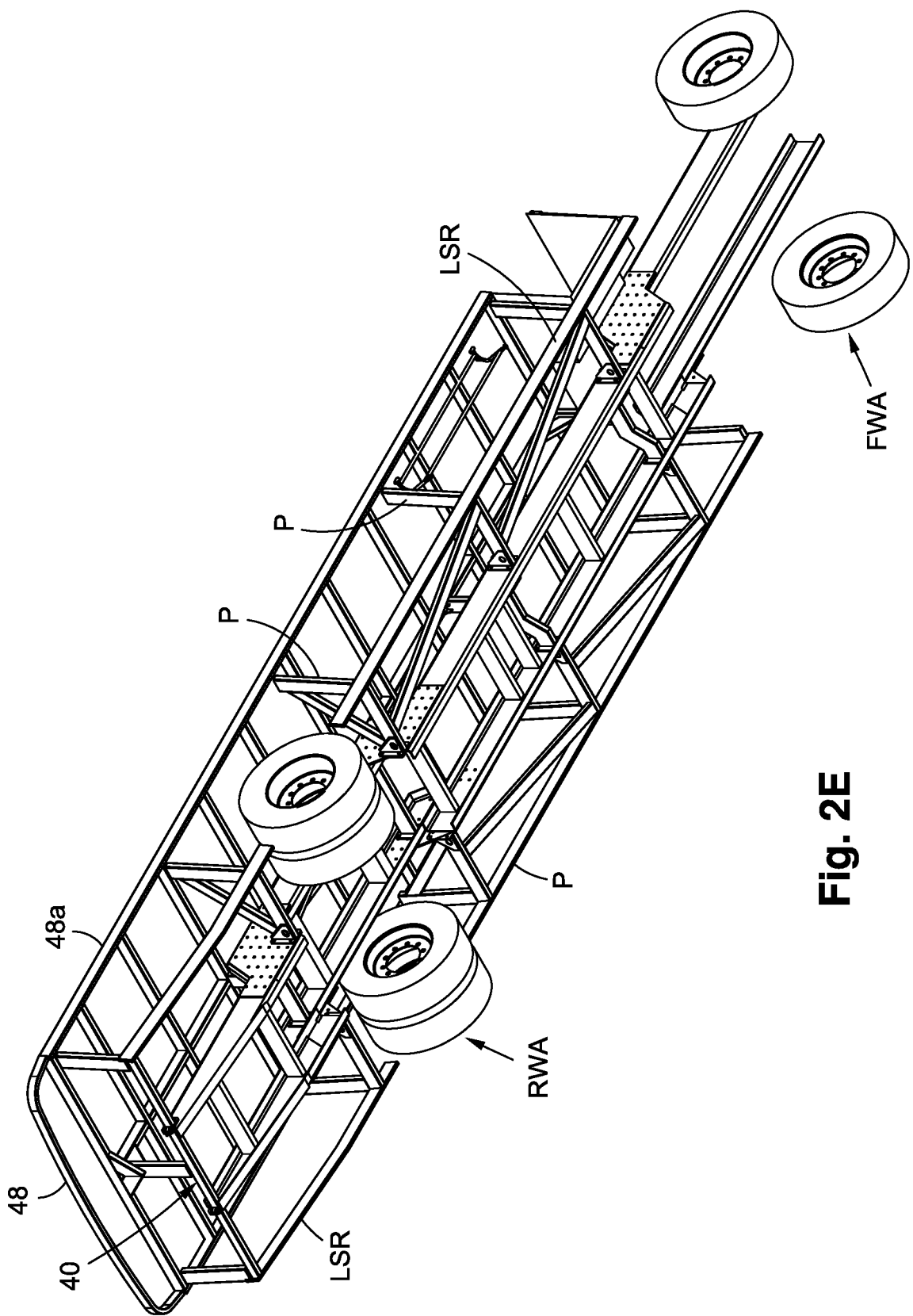
FIG. 2E is a perspective view looking at the underside of the sunken baggage compartment framework of the embodiment of our passenger vehicle shown in FIG. 8.
Figure 2F:
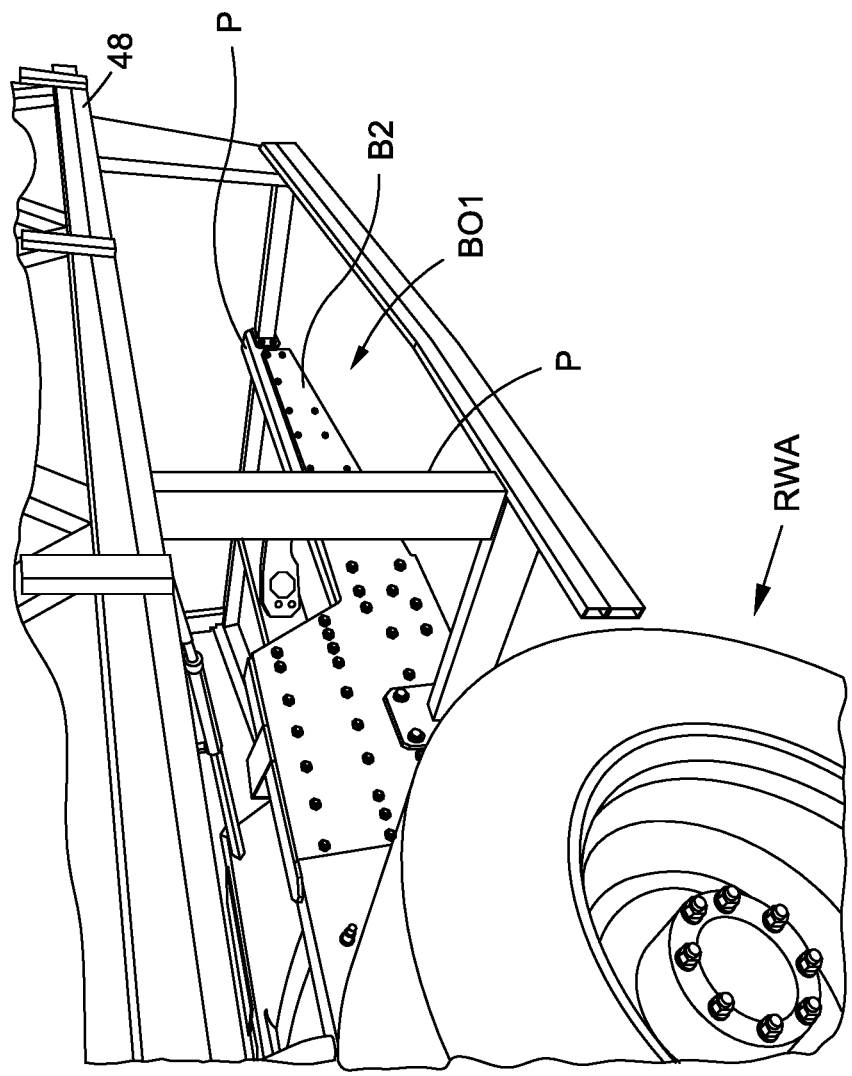
FIG. 2F is a perspective view looking at the rear portion of the sunken baggage compartment framework of the embodiment of our passenger vehicle shown in FIG. 8.
Figure 3:
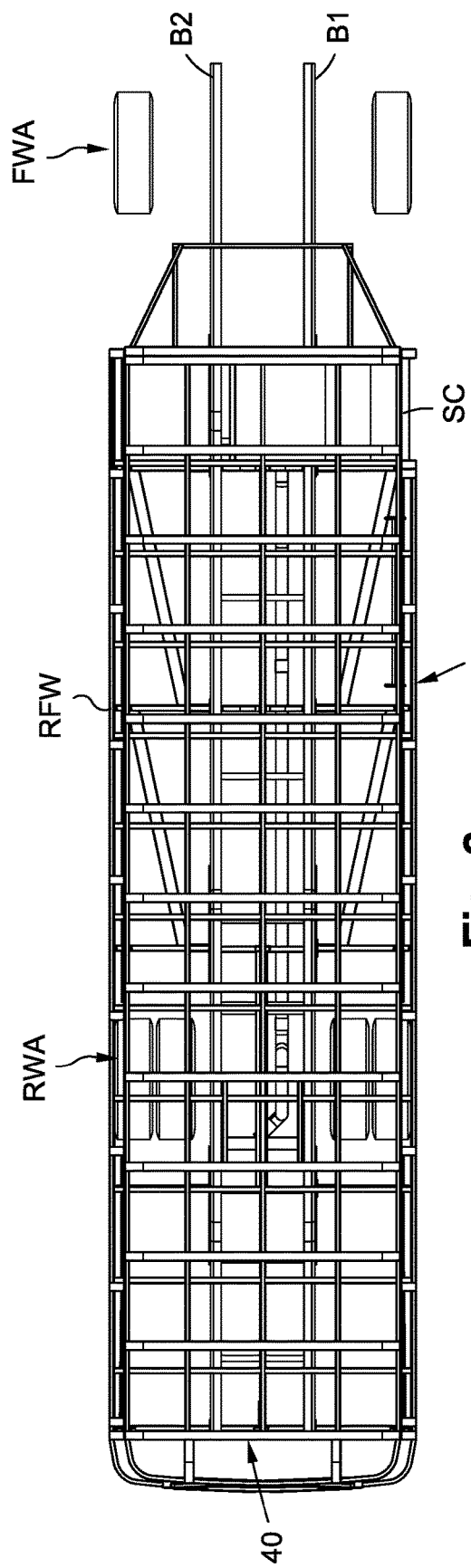
FIG. 3 is a top plan view for one embodiment of our passenger vehicle shown.
Figure 3A:
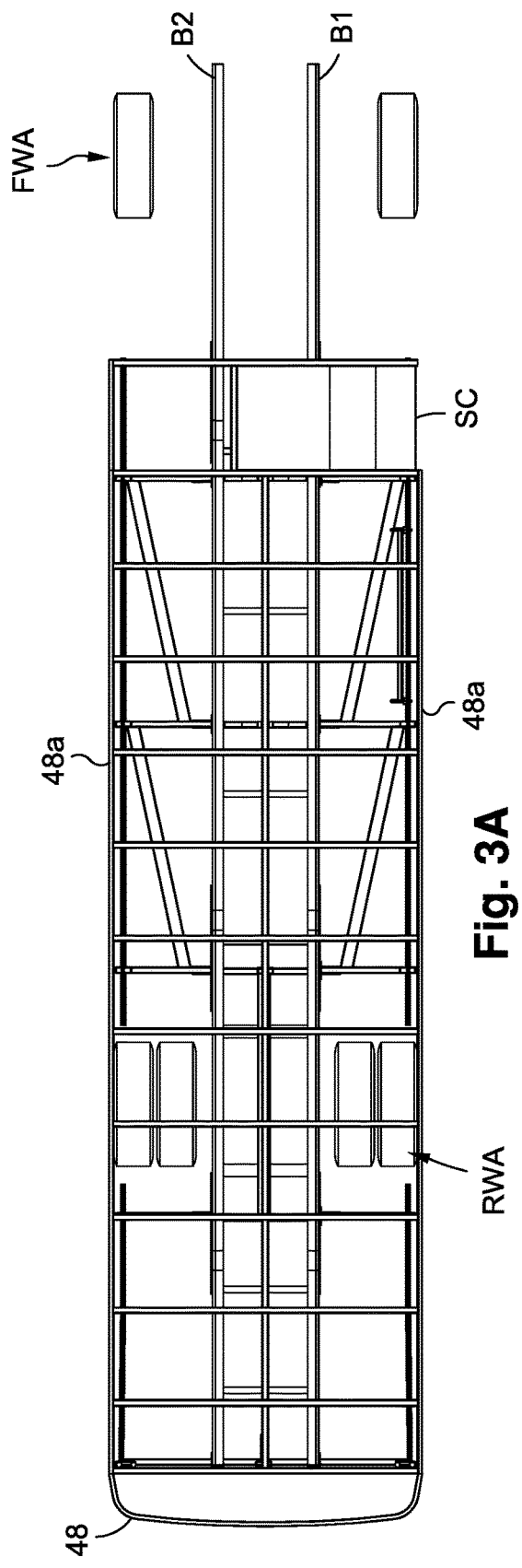
FIG. 3A is a top plan view of the similar to that of FIG. 3 with its roof framework removed.
Figure 5:
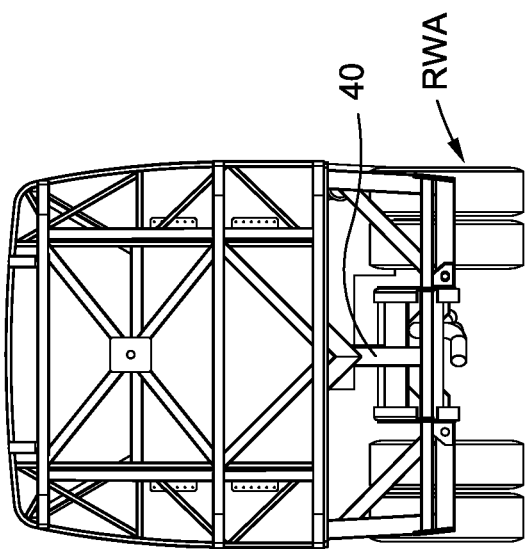
FIG. 5 is a rear view of the embodiment of our passenger vehicle shown in FIG. 8.
Figure 5A:
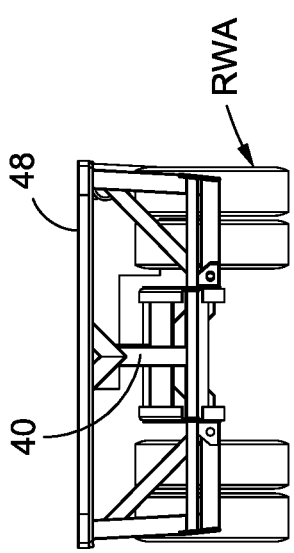
FIG. 5A is a rear view the similar to that of FIG. 5 with its passenger compartment framework removed.
Figure 6:
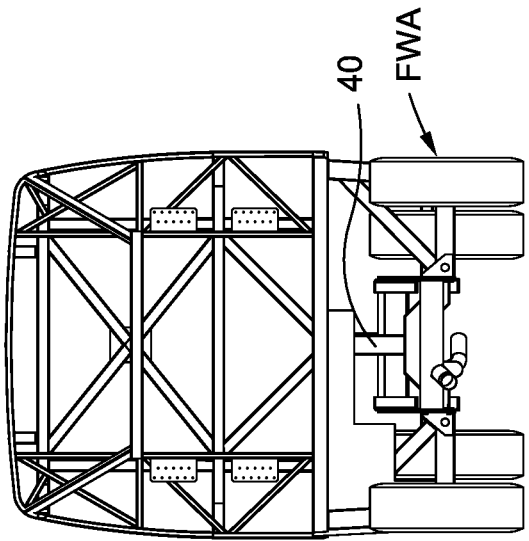
FIG. 6 is a front view of the embodiment of our passenger vehicle shown in FIG. 8.
Figure 6A:
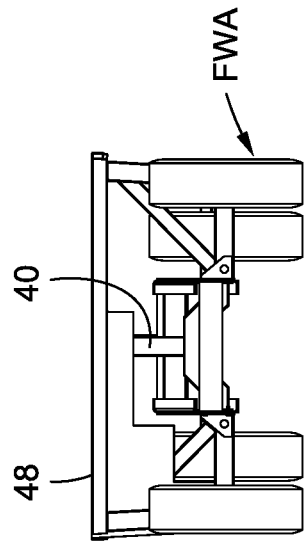
FIG. 6A is a front view the similar to that of FIG. 6 with its passenger compartment framework removed
Figure 7:
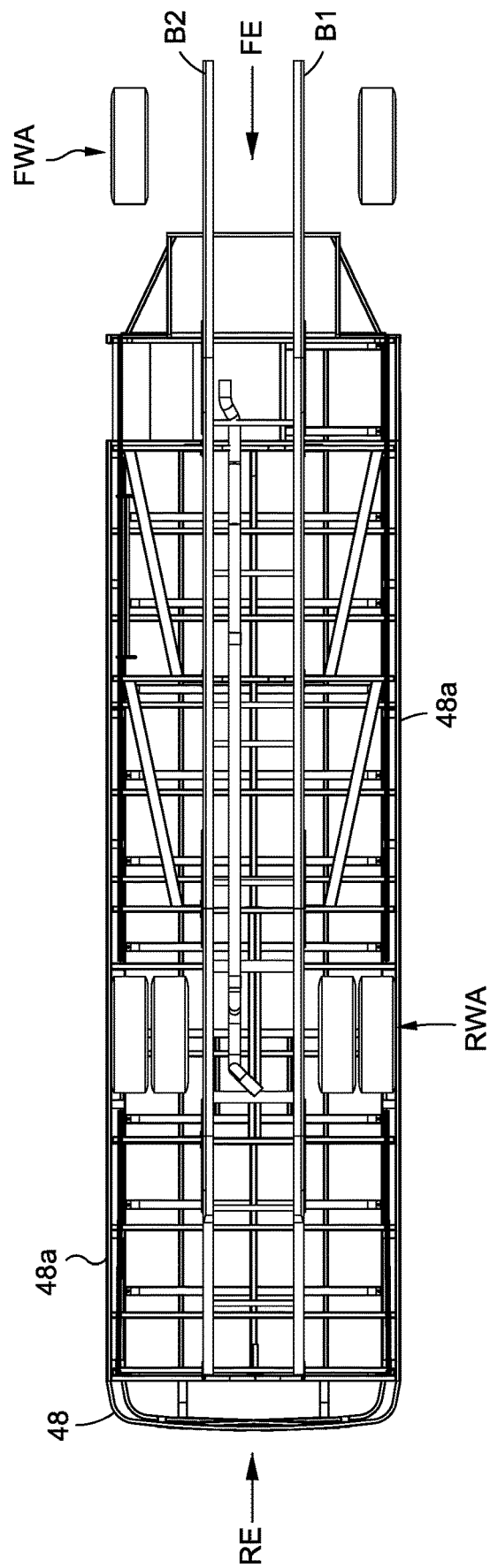
FIG. 7 is a bottom plan view of the framework for the embodiment of our passenger vehicle shown in FIG. 8.

As best depicted in FIG. 2D the parallel beams 32a and 32b of the vehicle chassis 30 depicted in FIGS. 1AA1 through 1AA3 are cut to construct the beams B1 and B2 of our passenger vehicle PV1. In the embodiment depicted in FIGS. 1 through 8, the beams 32a and 32b are severed in three places. This produces four (4) pairs of beam segments P1, P2, P3, and P4. Each pair has two (2) segments of equal length. The segment pairs P1, P2, P3, and P4 are aligned in a row from end to end and adjacent ends are attached to each other by means of offsetting coupling plates welded, riveted, or otherwise to securely connect the segments so that some segments are elevated relative to other segments. The motor M of the conventional chassis 30, the front wheel assembly FWA of the conventional chassis, and the rear wheel assembly RWA of the conventional chassis, steering and braking systems, drive train, etc. are all used in our passenger vehicle PV1 with minimal alterations, if any.

The reconfigured rigid beams B1 and B2 each have an opposed forward section FS and rearward section RS that are at the same elevation above ground G. The lower intermediate central section CS is between the elevated sections and is closer to ground than the forward section FS and rearward section RS. The opposed forward section FS and rearward section RS are at the same height such as, for example, 26 inches (the same distance as the linear parallel beams of the conventional chassis being used), and the distance above ground of the central section generally is from 10 to 18 inches, substantially closer to the ground than the beams of the conventional chassis 30. The segments of the support beams B1 and B2 forming the forward section FS and the rearward section RS are linear and parallel to the linear segments of the support beams B1 and B2 forming the central section CS. The pair of segments forming the central section CS have their opposed ends riveted to inner end segments of the forward section FS and rearward section RS.

Figure 8:
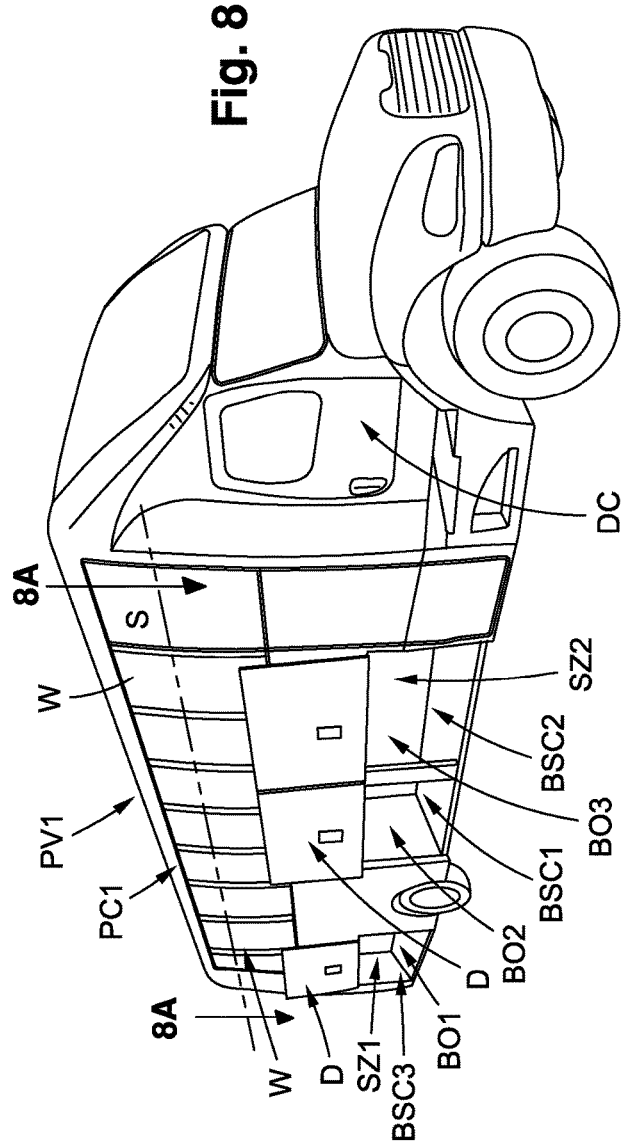
FIG. 8 is a perspective view of one embodiment of the non-obvious passenger vehicle disclosed herein.
Figure 8A:
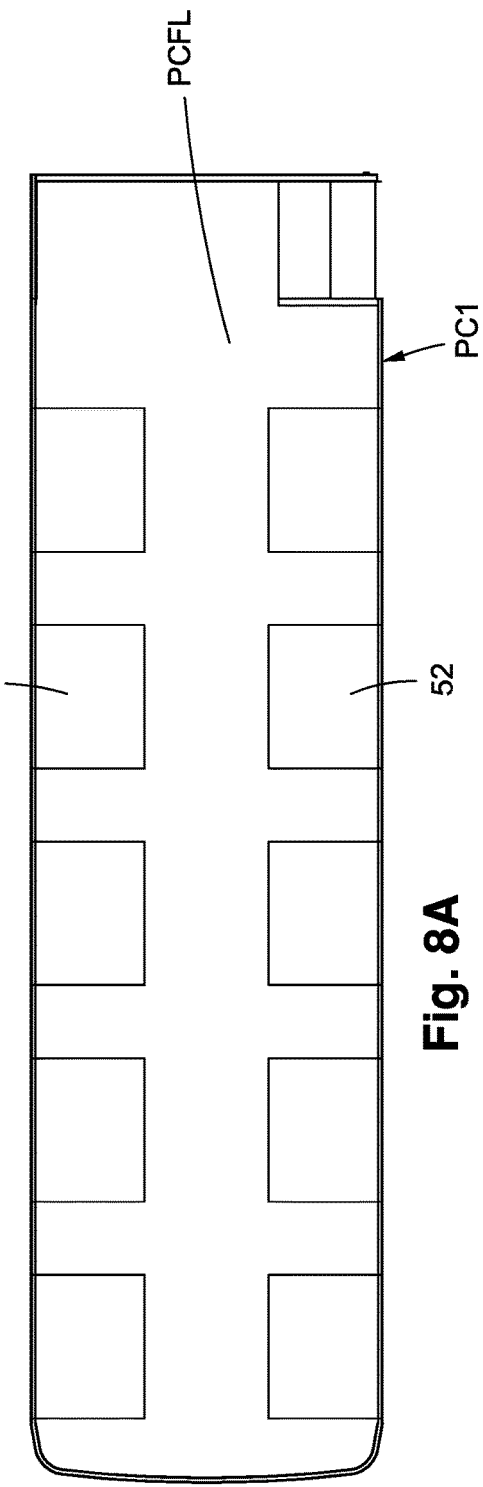
FIG. 8A is a cross-sectional view taken along line 8A-8A of FIG. 8.
Figure 8B:
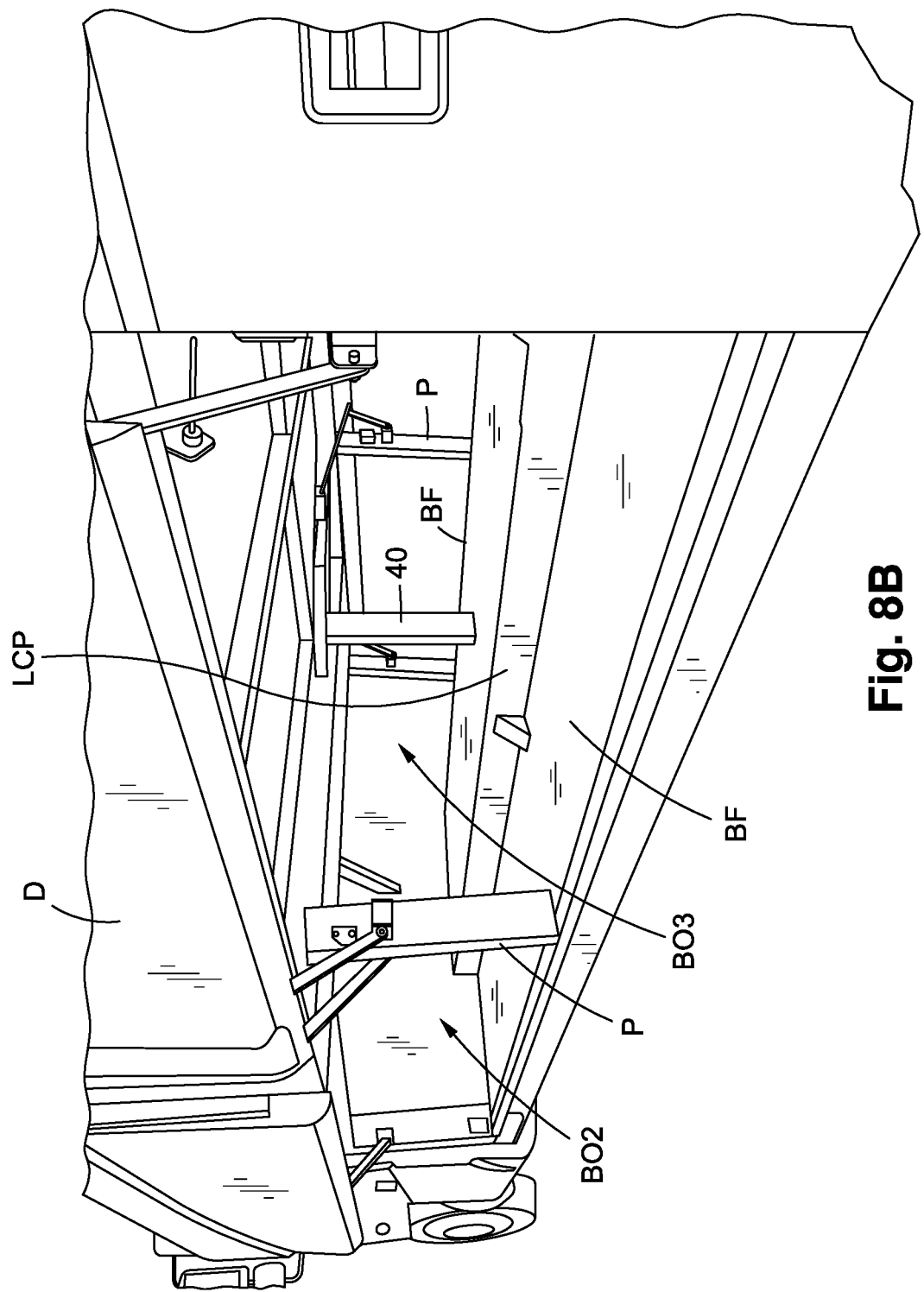
FIG. 8B is a perspective view of a baggage compartment with its opposed doors opened looking through to the opposed opening on the opposite side of the embodiment of our passenger vehicle shown in FIG. 8.
Figure 8C:
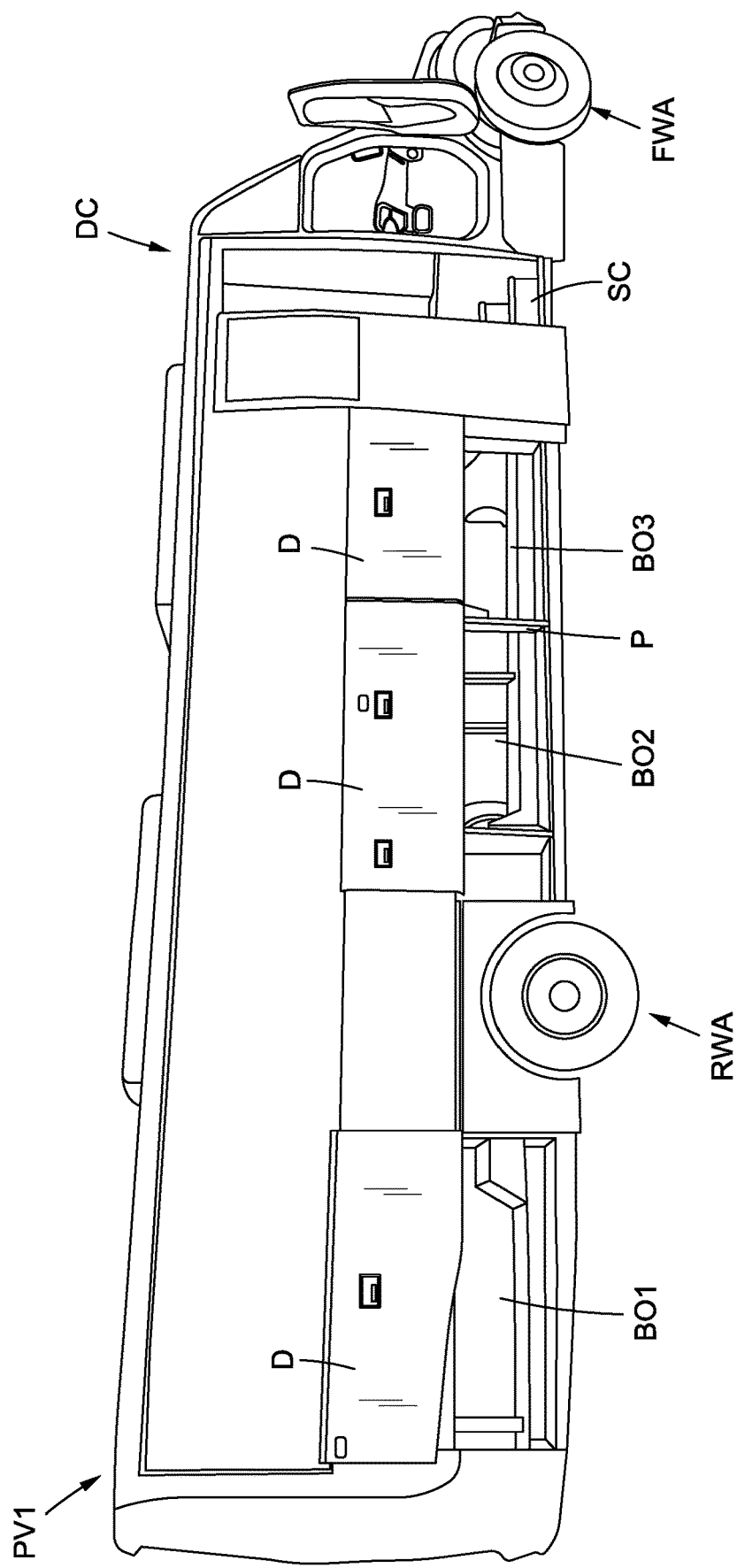
FIG. 8C is a side view of the embodiment of our passenger vehicle shown in FIG. 8. looking through the uncovered opposed openings accessing the vehicle's baggage compartments.

The reconfigured beams B1 and B2 extend most of the distance from a front to a rear of our passenger vehicle PV1 (FIG. 8, 8C). Mounted to the reconfigured beams B1 and B2 are the motor M, a front driver's compartment DC, an elevated rear passenger compartment PC1 to which passenger seats 52 are mounted as shown in FIG. 8A, and beneath the reconfigured beams B1 and B2 baggage compartments BC1 through BC3, which may be of the same general configuration, for example cubical. As illustrated in FIGS. 1 and 2 and FIG. 8, our passenger vehicle PV1 includes a front end FE, a rear end RE and a central longitudinal reference line RL. The beams B1 and B2 are of the same configuration and dimensions, straddling the reference line RL and extending above ground G from the front end FE to the rear end RE of our passenger vehicle PV1. These beams B1 and B2 are constructed from the beams of the conventional chassis 30 as discussed above. The rigid beams B1 and B2 each have opposed front and rear end sections FS and RS. The central section CS (FIG. 2A) is closer to ground G than the end sections as discussed above. The front wheel assembly FWA at the front end FE of our passenger vehicle PV1 extends across and is supported by the front end sections FS of the support beams B1 and B2, and a rear wheel assembly RWA at the rear end RE of our passenger vehicle PV1 extends across and is supported by the rear end sections RS of the support beams B1 and B2.

The embodiment of our passenger vehicle PV1 thus comprises the newly configured pair of parallel, rigid beams B1 and B2 constructed from the beams 32a and 32b and a unique baggage compartment framework BCF1 with potential obstruction by beams 32a and 32b minimized. The beams B1 and B2 are of the same configuration and dimensions and have a lowered central section CS. The front wheel assembly FWA and the rear wheel assembly RWA remain essentially intact as well as all essential components of the vehicle chassis 30. Only the drive shaft needs some modification during reconfiguration of the beams 32a and 32b. The reconfigured beams B1 and B2 each have a forward section FS and a rear section RS that are aligned and at the same elevation above ground G. The lower intermediate central section CS is between the elevated sections and is closer to ground G than the forward section FS and rearward section RS. The distance above ground of the opposed forward and rearward sections is typically 26 inches (the same distance as the linear parallel beams 32a and 32b of the conventional chassis 30), and the distance above ground G of the central section CS generally is from 10 to 18 inches, substantially closer to the ground than the beams of the conventional chassis 30.

As best shown in FIGS. 1, 2A and 4, the vehicle framework includes a passenger compartment framework PCF1 and a baggage compartment framework BCF1. The passenger compartment framework PCF1 includes a pair of side lattice frameworks LFW extending along each side S1 and S2 of our passenger vehicle PV1, a pair of window frameworks WFW extending along each S1 and S2 of our passenger vehicle PV1, a front side framework FSF, and a rear side framework RSF, with a roof framework RFW extending between the front side frameworks and connected thereto. The pair of lattice frameworks LFW each have a horizontally oriented, upper rail UR. The passenger compartment framework PCF1 and a baggage compartment framework BCF1 additionally employ a plurality of vertical, diagonal and horizontal supports rails SR connected together using conventional techniques to provide a sturdy support structure for the skin S. Specifically, the baggage compartment framework BCF1 includes the lower horizontal support rails LSR on each side S1 and S2 of the vehicle.

As best shown in FIG. 2C, a plurality of outboard, spaced apart, vertical posts P and an inboard central support structure 40 elevates a floor framework FF of the passenger compartment PC1 above the reconfigured beams B1 and B2. The central support structure 40 includes aligned vertical members VM1 through VM5 in a row (FIG. 2D). Each vertical member VM1 through VM5 has a pair of spaced apart feet 42 with one foot resting on the beam B1 and the other foot resting on the beam B2. A pair of crossed braces 44 reinforce the adjacent vertical members VM2 and VM3 and a plurality of braces 46 reinforce the posts P. The passenger compartment floor PCFL overlies and is attached to the floor framework FF, which has steel bars forming a rectangular perimeter 48. The upper rails UR of the lattice frame work LFW and opposed side segment 48a of the perimeter bar 48 are parallel to each other.

In our passenger vehicle PV1 there also are windows W in the opposed sides of the vehicle, and a staircase SC near the driver compartment DC leading from an entrance in one side of the vehicle to the elevated passenger compartment floor PCFL. The passenger compartment framework PCF1 comprises a pair of side lattice frameworks LFW (FIG. 2A) extending along each side of the vehicle including a pair of window frameworks WFW, one extending along each side of the vehicle, a roof framework RFW extending between the window frameworks WFW and connected thereto, and a baggage compartment framework BCF1 beneath the passenger compartment framework PCF1.

As best shown in FIG. 2B, the baggage compartment framework BCF1 includes the unobstructed storage zones SZ1 and SZ2 that are accessed through the baggage openings BO1 through BO3 on each of the opposed sides of the vehicle. The baggage compartment framework BCF1 has a baggage support structure BSS including the lower horizontal support rails LSR connected together beneath, and supporting, a baggage compartment floor BF on which baggage is placed. The baggage compartment framework BCF1 establishes the configuration and capacity or volume of the unobstructed storage zones SZ1 and SZ2, and defines the size, shape, and position of the baggage openings. The posts P, outboard side portions of the perimeter 48, and the lower horizontal support rails LSR are arranged to frame opposed baggage opening BO1, BO2, BO3 in the sides S1 and S2 of the vehicle. The baggage openings BO1, BO2, BO3 are aligned and in registration with each other, enabling baggage to be placed in the storage zones SZ1 and SZ2 from one side of the vehicle through one baggage opening and removed from the storage zone from the other side of the vehicle through the other baggage opening. The baggage compartment floor support structure BSS is positioned at generally the same height above ground level as upper edges of the central section CS of the reconfigured support beams B1 and B2 so that these upper edges form part of the passenger compartment floor support structure PCFL.

As best shown in FIG. 4, the horizontally oriented, upper rail UR of the lattice frameworks LFW functions as a horizontally oriented, lower rail section of the window frameworks WFW. As best shown in FIG. 2A, a plurality of cross rails CR extend crosswise from one side S1 of the passenger compartment framework PCF1 to the other side S2 of this passenger compartment framework, and each have opposed ends E1 and E2 that are, respectively, attached between the opposed side segments 48a of the perimeter bar 48. The cross rails CR support a passenger compartment floor support structure PCFL (FIG. 2A) resting on these cross rails and to which the seats (not shown) are mounted.

As best depicted in FIGS. 2B and 2C, the baggage compartment framework BCF1 includes the cross rails CR and a pair of opposed side segments 48a, which constitutes upper components of the baggage compartment framework BCF1. A pair of lower side rails LSR constitutes, in part, the lower components of the baggage compartment framework BCF1. The spaced apart, vertical posts are connected between the opposed side segments 48a and one of the lower side rails LSR. These posts P elevate the passenger compartment framework PCF1 and create a gap GA (FIG. 4, 4A) between the opposed side segments 48a of the baggage compartment framework BCF1 and the lower side rails LSR, establishing the height of storage zones SZ1 and SZ2 located beneath the floor PCFL in the passenger compartment PC1.

In this embodiment there are two storage zones SZ1 and SZ2: As best shown in FIGS. 2B and 2C, the baggage floor BF rearward of the rear wheel assembly RWA has an area A1 of approximately 100 cubic feet and the pair of baggage floors BF rearward of the staircase SC and in advance of the rear wheel assembly RWA has a combined area A2 of approximately 200 cubic feet.

Because of the reconfiguration of the pair of linear parallel beams 32a and 32b of the conventional chassis 30, unobstructed storage zones SZ1 and SZ2 are constructed that are accessed through three baggage openings BO1 through BO3 (FIG. 8, 8B, 8C) in each side of our passenger vehicle PV1. These three baggage openings BO1 through BO3 in the sides are aligned and in registration with each other. Because the baggage openings BO1 through BO3 are aligned and in registration, baggage may be placed in the storage zones SZ1 or SZ2 from, for example, the one side S1 through the one baggage opening BO1 and removed from the storage zone SZ1 from the other side S2 through its opposed baggage opening. The baggage compartment floor BF extends crosswise between and is supported by the pair of lower side rails LSR.

The baggage floors BF in the storage zones SZ1 and SZ2 are positioned at generally the same height above ground G as the upper edges UED of the central section CS of the reconfigured support beams B1 and B2. The reconfigured beams B1 and B2 are connected together by beam cross rails BCR, and these beam cross rails and the upper edges UED of the central section CS of the reconfigured support beams B1 and B2 form part of the baggage floor support structure BSS upon which the baggage floor BF rests. The storage zones SZ1 and SZ2 are boxlike, having a rectangular top, sides, opposed same sized openings, and a floor with dimensions, for example, a height generally from 23 to 33 inches, a width varying up to about 80 inches, and a depth approximately the width of the conventional chassis; generally from 90 to 102 inches.

As best depicted in FIG. 8B, a longitudinal, central portion LCP of the floor BF of the baggage compartment may be raised slightly, but not in a manner that interferes with transferring baggage from one side of the vehicle to the other side of the vehicle through a baggage compartment having aligned baggage openings on both side of our passenger vehicle PV1.

FIGS. 9 and 9A

Our passenger vehicle PV2 shown in FIGS. 9 and 9A has only a single baggage storage compartment BSC4 constructed at the rear of the vehicle beneath this vehicle's elevated passenger compartment PC2. In this embodiment, only passenger vehicle PV2's rear portion at its rear end has an elevated passenger compartment floor PCFL2 with a raised floor and a lowered, severed beam portion. In a manner similar to that discussed in connection with our passenger vehicle PV1, a plurality of outboard, spaced apart, vertical posts and an inboard central support structure elevates above the reconfigured beams B1 and B2 a floor framework (not shown) of the passenger compartment PC2. In this case, the beams 32a and 32b of the vehicle chassis 30 are severed only rearward of the rear wheel assembly RWA of the vehicle chassis 30. This severed beam section is reconnected to a remaining, elevated portion of the beams 32a and 32b to construct a rear storage compartment BSC4 beneath the passenger compartment PC2.

Scope of the Invention

The above presents a description of the best mode contemplated of carrying out our passenger vehicle, and of the manner and process of making and using it, in such full, clear, concise, and exact terms as to enable a person skilled in the art to make and use. Our passenger vehicle is, however, susceptible to modifications and alternate constructions from the illustrative embodiment discussed above which are fully equivalent. Consequently, it is not the intention to limit our passenger vehicle to the particular embodiment disclosed. On the contrary, the intention is to cover all modifications and alternate constructions coming within the spirit and scope of our passenger vehicle as generally expressed by the following claims, which particularly point out and distinctly claim the subject matter of the invention:

The invention claimed is:

1. A passenger vehicle including
a vehicle chassis that is original manufacturing equipment and includes a motor at a front of the chassis and a pair of parallel, rigid, linear beams straddling a central longitudinal reference line of the chassis and extending above ground from the front to a rear of the chassis,
said beams comprising reconfigured sections of support beams of the original manufacturing equipment,
said reconfigured sections including
a pair of opposed, parallel, forward, linear beam sections,
a pair of opposed, parallel, rearward, linear beam sections, and
a pair of opposed, parallel, central, linear beam sections,
a front wheel assembly near the front of the vehicle and extending across and supported by the pair of opposed forward beam sections of the parallel beams at a predetermined height above ground,
a rear wheel assembly near the rear of the vehicle and extending across and supported by the pair of rearward beam sections of the parallel beams that are also at said predetermined height above ground,
connector members attached to the forward and rearward beam sections that lower said pair of central, parallel sections with respect to the forward and rearward beam sections, so that said central beam sections are closer to ground than the forward and rearward beam sections,
a passenger compartment framework including an elevated floor and a baggage compartment framework beneath the passenger compartment framework,
said baggage compartment framework including a floor supported by said central sections to provide a storage zone that is accessed through a baggage opening on each of said opposed sides of the vehicle,
said baggage openings being aligned to enable baggage to be placed in the storage zone from one side of the vehicle through one baggage opening and removed from the storage zone from the other side of the vehicle through the other baggage opening.

2. Our passenger vehicle of claim 1 where the connector members assemble the beam sections so that the parallel support beams are side by side and of the same configuration and dimensions.

3. A passenger vehicle including
a vehicle chassis comprising a motor at a front of the chassis and a pair of parallel, rigid, linear beams that are side by side and of the same configuration and dimensions straddling a central longitudinal reference line of the chassis and extending above ground from the front to a rear of the chassis,
said support beams having
a first pair of opposed, parallel, forward, linear beam sections supporting a front wheel assembly,
a second pair of opposed, parallel, rearward, linear beam sections supporting a rear wheel assembly, and
a third pair of opposed, parallel, central, linear beam sections between the first and second pairs, and
connector members attaching the sections together with the third pair closer to the ground that the first and second pair,
a passenger compartment framework including a baggage compartment framework beneath said passenger compartment including a floor supported by said third pair of central sections to provide a storage zone that is accessed through a baggage opening in opposed sides of the vehicle,
said baggage openings being aligned to enable baggage to be placed in the storage zone from one side of the vehicle through one baggage opening and removed from the storage zone from the other side of the vehicle through the other baggage opening.

4. A passenger vehicle including
a vehicle chassis that is original manufacturing equipment and includes a motor at a front of the chassis and a pair of parallel rigid, linear support beams straddling a central longitudinal reference line of the chassis and extending above ground from the front to a rear of the chassis,
said beams comprising reconfigured sections of support beams of the original manufacturing equipment,
said reconfigured sections including
a pair of opposed, parallel, forward, linear beam sections,
a pair of opposed, parallel, rearward, linear beam sections, and
a pair of opposed, parallel, central, linear beam sections,
said pair of central sections being closer to the ground that the forward and rearward sections and second pair,
a front wheel assembly near the front of the vehicle and extending across and supported by the pair of opposed forward sections of the parallel beams at a predetermined height above ground,
a rear wheel assembly near the rear of the vehicle and extending across and supported by the pair of rearward sections of the parallel beams that are also at said predetermined height above ground,
a passenger compartment framework,
a baggage compartment framework beneath the passenger compartment framework and including a pair of upper side rails and pair of lower side rails,
said lower side rails at or near the level of the central sections of the beams and the upper side rails above the beams to provide an unobstructed storage zone that is accessed through a baggage opening on each of said opposed sides of the vehicle,
the pair of upper side rails and pair of lower side rails being separate by the distance from 9 to 14 inches,
said baggage openings being aligned enabling baggage to be placed in the storage zone from one side of the vehicle through one baggage opening and removed from the storage zone from the other side of the vehicle through the other baggage opening,
said storage zone has a volume from 300 to 500 cubic feet.

5. A passenger vehicle including
a front, a rear, opposed sides, a passenger compartment including a floor to which seats are attached, and a baggage compartment beneath the passenger compartment,
a front wheel assembly near the front of the vehicle and a rear wheel assembly near the rear of the vehicle,
said front and rear wheel assemblies being components of a vehicle chassis including a pair of linear, central, parallel beams supporting said assemblies at a predetermined height above ground,
at least one lowered section of the beams that is displaced with respect to one or more other sections of the beams and is reconfigured to be closer to ground than said predetermined height, a support structure that elevates the floor of the passenger compartment with respect to said lowered section, said passenger compartment floor and said lowered section of the beams separated by a distance that is at least 9 inches to establish a storage zone beneath the passenger compartment, said baggage compartment including a floor that is supported at least in part by the lowered section of the beams and has a baggage opening in each side of the vehicle providing access to the storage zone to enable baggage to be placed in the storage zone from one side of the vehicle through one baggage opening and removed from the storage zone from the other side of the vehicle through the other baggage opening.

6. A method of manufacturing a passenger vehicle including a front, a rear, and opposed sides, and a central support structure extending above ground from the front to the rear of the vehicle, said method comprising (a) providing a vehicle chassis that is original manufacturing equipment and includes a central support structure comprising a pair of linear, central, parallel support beams that support a front wheel assembly and a rear wheel assembly and a motor mounted to a front of the chassis operably connected to the rear wheel assembly, and (b) severing the support beams into three sections and connecting the three sections together to reconfigure the support beams of the original manufacturing equipment into a pair of opposed, parallel, forward, linear beam sections, a pair of opposed, parallel, rearward, linear beam sections, and a pair of opposed, parallel, central, linear beam sections, said pair of central sections being closer to the ground that the forward and rearward sections and second pair, (c) constructing an elevated passenger compartment framework attached to the reconfigured support beams and a baggage compartment framework beneath the passenger compartment framework, said baggage compartment framework including a baggage opening in each opposed side of the vehicle providing access to an unobstructed storage zone that enables baggage to be placed in the storage zone from one side of the vehicle through one baggage opening and removed from the storage zone from the other side of the vehicle through the other baggage opening.

* * * * *